US006654684B2

(12) United States Patent
Shinada et al.

(10) Patent No.: US 6,654,684 B2
(45) Date of Patent: Nov. 25, 2003

(54) NAVIGATION APPARATUS AND METHOD THAT PERFORMS ROUTE GUIDING TO A PROVIDER LOCATION

(75) Inventors: Akira Shinada, Tokyo (JP); Masayasu Ito, Chiba (JP); Eiichi Tanaka, Kanagawa (JP); Makoto Sasaki, Chiba (JP); Shigeru Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/871,542

(22) Filed: May 31, 2001

(65) Prior Publication Data
US 2002/0016671 A1 Feb. 7, 2002

(30) Foreign Application Priority Data
Jun. 1, 2000 (JP) ........................................ 2000-164642

(51) Int. Cl.$^7$ .............................................. G01C 21/05
(52) U.S. Cl. ...................................................... 701/211
(58) Field of Search ................................. 701/200, 202, 701/211, 213, 23, 24, 25; 342/357.01, 357.06, 357.09, 357.12, 357.13; 340/988

(56) References Cited

U.S. PATENT DOCUMENTS

| 6,161,071 A | * | 12/2000 | Shuman et al. | ............... | 701/48 |
| 6,336,073 B1 | * | 1/2002 | Ihara et al. | ................. | 701/202 |
| 6,385,465 B1 | * | 5/2002 | Yoshioka | .................... | 455/564 |
| 6,401,029 B1 | * | 6/2002 | Kubota et al. | .............. | 700/201 |

FOREIGN PATENT DOCUMENTS

| JP | 05-134602 | 5/1993 |
| JP | 11-167695 | 6/1999 |
| JP | 11-325923 | 11/1999 |

OTHER PUBLICATIONS

Patent Abstracts of Japan 11–167695, Jun. 22, 1999.
Patent Abstracts of Japan 11–325923, Nov. 26, 1999.
Patent Abstracts of Japan 05–134602, May 28, 1993.

* cited by examiner

Primary Examiner—Yonel Beaulieu
(74) Attorney, Agent, or Firm—Frommer Lawrence & Haug LLP; William S. Frommer; Glenn F. Savit

(57) ABSTRACT

A navigation apparatus measures the position of a vehicle based on position information and performing route guiding based on map information. The navigation apparatus includes an inputting unit for inputting specific information on a product or the like and selection conditions for the product or the like, a transmitting unit for transmitting the input specific information to an external storage unit in which characteristic information on the product or the like is stored, a receiving unit for receiving the characteristic information which is transmitted from the external storage unit, a retrieving unit for retrieving optimal characteristic information matching the selection conditions from the received characteristic information, a displaying unit for displaying the retrieved characteristic information, and a guiding unit for automatically setting the position of a provider for the product or the like based on the retrieved characteristic information and performing route guiding to the position of the provider.

12 Claims, 3 Drawing Sheets

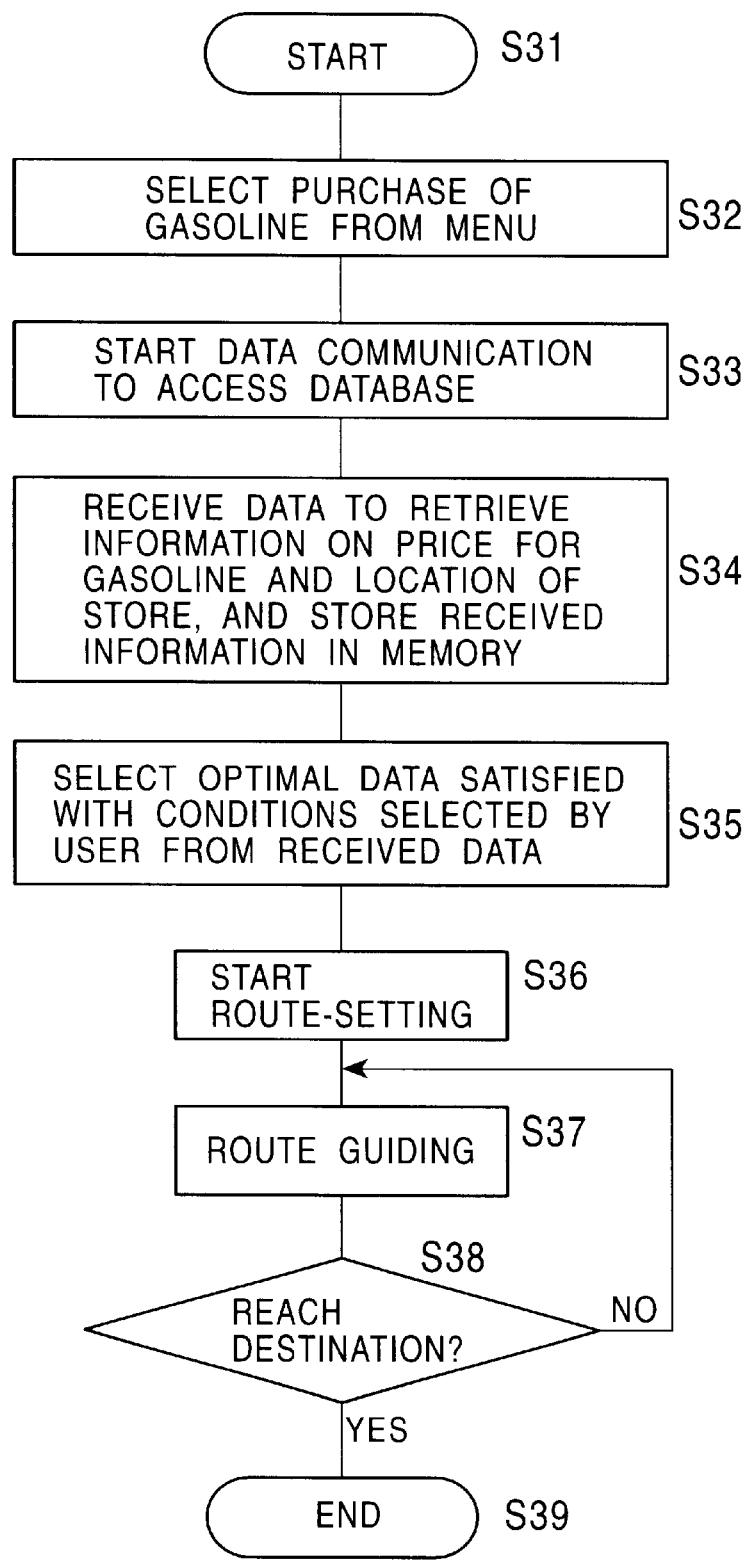

NAVIGATION APPARATUS AND METHOD THAT PERFORMS ROUTE GUIDING TO A PROVIDER LOCATION

BACKGROUND OF THE INVENTION

1. Field of the Invention

The present invention relates to navigation apparatuses, and more particularly relates to a navigation apparatus which collects characteristic information (for example, product information, price, maker, and sales information, shop position information, and the like) on products and services (hereinafter referred to as the product and the like), based on this collected characteristic information, searches for the optimum product and the like, automatically determines the position of the provider of the product and the like based on the searched characteristic information, and guides a user from his/her current position to the position of the provider.

2. Description of the Related Art

Navigation apparatuses instruct GPS (Global Positioning System) receivers to receive position information transmitted from satellites and the like, to find the current positions of vehicles based on the transmitted position information, and to display maps indicating the current positions of vehicles on monitor units. In addition, routes to destinations are searched and are displayed so that users can be guided. Thus, navigation apparatuses have been widely used to accurately guide vehicles to their destinations.

Navigation apparatuses basically operate in the above-described manner. Some navigation apparatuses are provided with the following features in order to further increase their convenience.

(1) Other than map information, various information, required for search and guiding, such as the locations of and the routes to shops is stored in a memory medium, and the monitor unit displays the information along with the map thereon.

(2) A cellular phone is connected thereto or incorporated therein, and certain information can be obtained and displayed by accessing the Internet via this cellular phone.

(3) As disclosed in the navigation system in Japanese Unexamined Patent Application Publication No. 5-134602, a dedicated CD-ROM is loaded into the navigation system and a search operation is performed, whereby an information transmission-side apparatus separately disposed is contacted. Thereafter business data such as the current sales situation, business hours, and price data of services (such as gas stations) for which the information transmission-side apparatus is responsible is shown along with the map displayed on the navigation system so that the optimal service provider can be selected.

(4) As disclosed in the information exchange system in Japanese Unexamined Patent Application Publication No. 11-167695, since service information on the service providers such as gas stations, restaurants, and shops along the route is provided by making use of VICS (Vehicle Information and Communication System) that primarily transmits traffic information from the street side to the vehicle side, necessary information is selected from information transmitted in accordance with specific conditions (the type of provider or the degree of detail of provided information) set by a driver or a fellow passenger and is provided to the driver or the like.

(5) As disclosed in the navigation system in Japanese Unexamined Patent Application Publication No. 11-325923, a transmitter station, which is provided in a shop, and whose wave coverage area is predetermined (for example, a radius of a few kilometers to a few tens of kilometers), transmits specific information on the location, an advertisement, and the like of the shop by FM (Frequency Modulation) waves. When a receiver, mounted in the navigation system in the vehicle which enters the coverage area, receives the FM waves, the transmitter station location and advertisement information on the shop (the product information advertisement), and the like are displayed on the monitor unit along with the route of the shortest distance to the shop.

However, these conventional navigation systems have the following problems.

In the navigation system (1), the size of the memory medium limits the amount of information that can be stored in the memory medium and the information stored in the memory medium may be outdated.

In the navigation system (2), with the use of the cellular phone problems related to specification of a telephone number, time required for retrieving information, and cost may arise.

In the navigation system (3), loading the dedicated CD-ROM and the like make the operation relatively complicated. In addition, since only sales data is shown on the map, the user must set the route to the service provider to the navigation system in accordance with the shown sales data.

Since the information exchange system (4) is independent from the navigation system, even though the service provider is determined, this information exchange system offers no service to the navigation system concerning the route to the determined service provider.

In the navigation system (5), since, when the user's vehicle enters the wave coverage area of the shop, information is provided in a one-way manner from the shop to the user, the desired information is not always available.

SUMMARY OF THE INVENTION

Accordingly, the present invention is made to solve the foregoing problems of the conventional arts. A first object of the present invention is to achieve favorable purchases, when a product and the like are needed during driving, by obtaining characteristic information on products, such as price information and sales information for a region covering the current location, and by then selecting the optimal product and the like based on the information obtained while safely guiding the user to the provider for the selected product and the like, thereby eliminating the necessity of performing route setting during driving. A second object of the present invention is to provide a navigation system which can perform information retrieval on its own. A third object of a present invention is to provide the navigation system which can store necessary information therein regardless of the amount of built-in memory.

To this end, there is provided a navigation apparatus for measuring the position of a vehicle based on position information and performing route guiding based on map information. This navigation apparatus includes an inputting unit for inputting specific information on a product or the like and selection conditions for the product or the like, a transmitting unit for transmitting the input specific information to an external storage unit in which characteristic information on the product or the like is stored, a receiving unit for receiving the characteristic information which is transmitted from the external storage unit, a retrieving unit for retrieving optimal characteristic information matching the selection conditions from the received characteristic information, a displaying unit for displaying the retrieved characteristic information, and a guiding unit for automatically setting the position of a provider for the product or the like based on the retrieved characteristic information and performing route guiding to the position of the provider.

A navigation apparatus may further include a storage unit for storing the received characteristic information.

A navigation apparatus may further include a storage unit for storing the selection conditions for the product or the like.

The transmitting unit may transmit the selection conditions for the product or the like to the external storage unit.

The selection conditions for the product or the like may include at least type and price of the product or the like.

Route guiding to the position of the provider may be performed using route display and/or speech.

According to the present invention, the following advantages can be obtained.

Since information retrieval and destination setting can be automatically performed, a user does not have to retrieve information and the like in advance. Since setting information can be stored, there is no need to re-input. In addition, since information on necessary products and the like can be retrieved from a database in a fixed station, retrieved information can be stored and used repeatedly.

In particular, for example, even when gasoline has to be supplied during driving in a strange place, the user can be guided to the gas station in which the best gasoline under desired conditions of the user is available.

Unlike a conventional case which forces the user to examine the prices and the like during driving, the navigation apparatus according to the present invention does not spoil his or her attention during driving. In addition, unlike a conventional case which employs the Internet, the navigation apparatus according to the present invention does not spoil his or her attention because of its usability.

Since the navigation apparatus according to the present invention does not require anything else, there is no need to waste unnecessary electric power, papers and the like.

Since the navigation apparatus according to the present invention can write information directly to the database in the fixed station, necessary information can be stored without adversely impacting the capacity storage of the navigation apparatus side.

BRIEF DESCRIPTION OF THE DRAWINGS

FIG. 3 is a flowchart illustrating a procedure up to perform route-guiding to a destination after the initial conditions are set.

DESCRIPTION OF THE PREFERRED EMBODIMENTS

Figure 1:
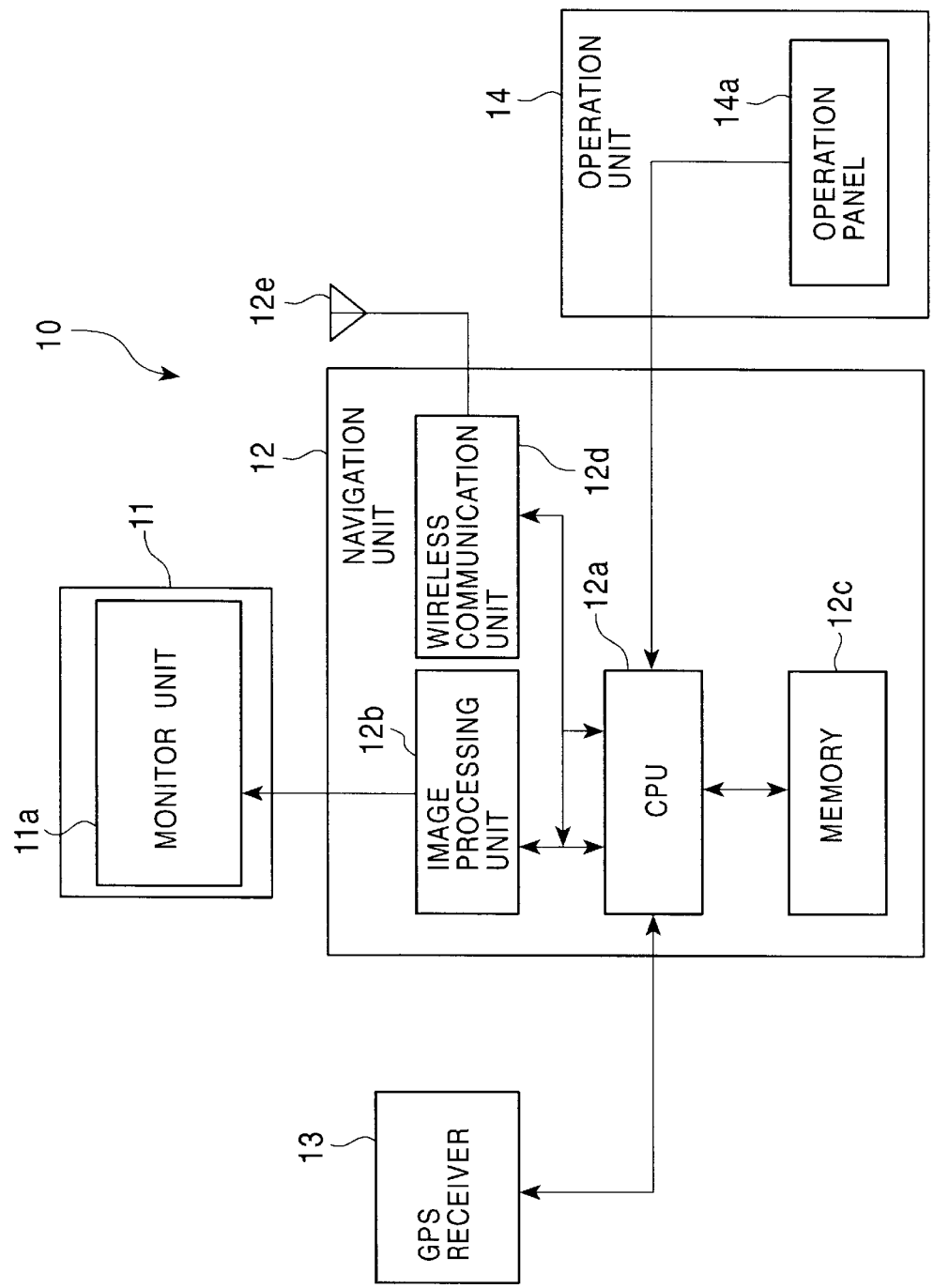
FIG. 1 is a block diagram of the primary construction of a navigation apparatus according to the present invention.

FIG. 1 is a block diagram showing a primary construction of a navigation apparatus to which the present invention is applied.

A navigation apparatus 10 according to the present invention includes a monitor unit 11 provided with a monitor 11a using, for example, a liquid crystal, for displaying information such as map information, information obtained by wireless communication, and information on the current position of the vehicle; a navigation unit 12 having a CPU 12A, an image processing unit 12b for generating image information which can be displayed in color using an NTSC (National Television System Committee) signal, a PAL (Phase Alternation Line) signal, an RGB signal, or the like based on map information and information obtained by wireless communication, a memory 12c for storing map database and the like therein, a wireless communication unit 12d and a transmission/reception antenna 12e for performing two-way data communication with a fixed station; a GPS receiver 13 for receiving position information transmitted from satellites; and an operation unit 14 having an operation panel 14a. The CPU 12a determines what to do based on instructions given via the operation panel 14a. In addition, the CPU 12a performs main signal processing, which normally controls the overall system such as computing the vehicle position based on information from the GPS receiver 13 or instructing the image processing unit 12b to perform image processing on retrieve map data from the memory 12c.

An operation of the navigation system having the above-described construction is described.

By operating the operation panel 14a, an initial-setting shopping menu stored in the memory 12c is displayed on the monitor 11a, so that a desired product or service (referred to as the product or the like) can be selected. An initial-setting screen with information related to the purchase of the selected product or the like is displayed on the monitor unit 11. When the initial-setting screen is displayed, a user such as a driver inputs selection criteria for purchase, such as desired price (the cheapest one, possibly), type of product, size, maker, and distance to the provider (the shop or the like) of the product or the like. In addition, the user can prioritize selection criteria and order them according to the priority. The initial setting information set in the above-described manner is stored in the memory 12c. This initial setting information may be stored in a database of the fixed station via wireless communication.

After the initial setting is completed, a shopping menu is displayed on the monitor 11a. When the user selects a product or the like from the shopping menu, selection information on the selected product or the like is transmitted via the wireless communication unit 12d and the transmission/reception antenna 12e to the fixed station automatically or by means of an operation of the operation panel 14a based on instructions from the CPU 12a.

A fixed station is provided in an area in which, for example, a gas station or a shop exists and the fixed station includes a database in which information on the shop and the like concerning, for example, location, the products or the like in which the shop deals, names of brands available, price, business hours, and the like are registered. In addition, the fixed station includes a wireless communication unit for data communication having a communication radius of, for example, a few kilometers to several tens of kilometers.

When the fixed station receives specified information on the product and the like from the navigation apparatus within the communication radius, the fixed station searches the database for information on the specified product or the like. When the information is found, the fixed station retrieves the information from the database and transmits it to the navigation apparatus. When the information is not found, the fixed station informs the navigation apparatus to that effect.

A fixed station may be provided for a plurality of shops grouped according to a predetermined area, or a fixed station may be provided for each shop.

When receiving the information on the product or the like from a fixed station, the navigation apparatus stores the received information in the memory 12c. The CPU 12a retrieves the optimal information matching the conditions set by the user from the stored characteristic information and causes the retrieved information to be displayed on the monitor 11a. One piece of information may be automatically selected from the retrieved information. Alternatively, a plurality of candidate information may be selected from the retrieved information, so that the user can select from them.

When information on the optimal product or the like is retrieved, the position of the shop or the like and intermediate points along the way to the shop are automatically set based on the retrieved information, and a destination is shown in accordance with the setting on the map displayed on the monitor 11a. In addition, route guiding is performed using synthesized-speech, display, and the like in the same manner as in typical navigation apparatuses.

When route guiding to an intermediate point is initially set as a destination and the user reaches this intermediate point, the navigation apparatus subsequently performs route guiding to the final destination.

When the navigation apparatus receives a message from the fixed station that no product or the like matching the required conditions has been found, the monitor unit 11 displays a message to this effect.

Since shopping menu information to which the user's desired condition is applied is stored in the memory 12c or the database in the fixed station, this shopping menu information can be used repeatedly. When the shopping menu information is used, the conditions applied to the information may be changed or deleted by operating the control panel 14a in an arbitrary manner.

An operation of the navigation apparatus according to the present invention is described in more detail with reference to FIGS. 2 and 3 by taking a case, in which the gasoline is purchased, as an example.

Figure 2:
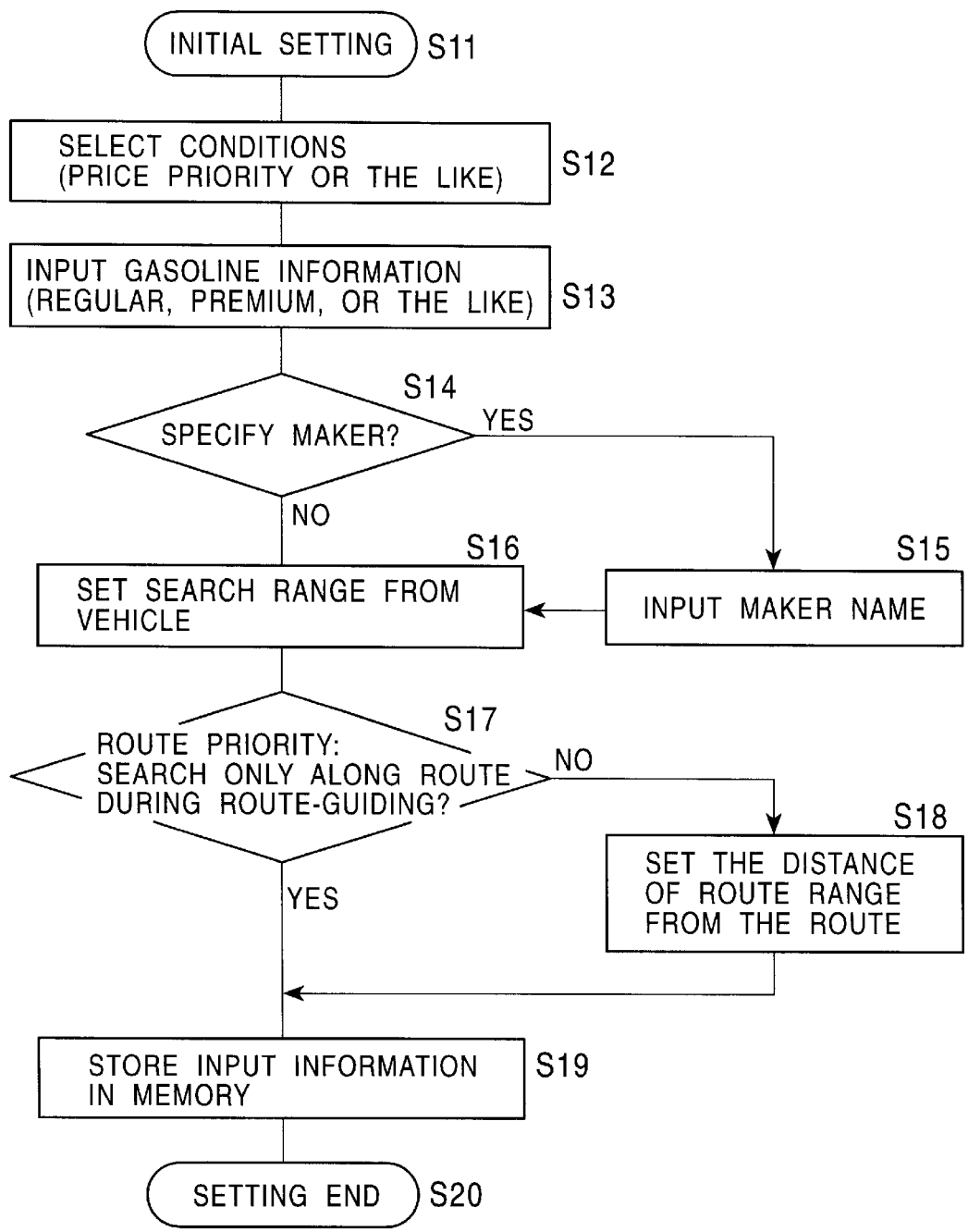
FIG. 2 is a flowchart illustrating a procedure to set initial conditions when gasoline is purchased for the first time.

FIG. 2 shows a flowchart showing a procedure for setting initial conditions in a case in which the gasoline is purchased for the first time.

The purchase menu is displayed on the monitor unit 11 based on operations performed on the operation panel 14a by the user such as the driver or a fellow passenger. When the user specifies the gasoline, an initial setting screen concerning gasoline purchase is displayed (step S11). A priority condition such as the price is selected from the screen list (step S12) and then a type of gasoline such as the regular gasoline, the premium gasoline, or light oil is selected from the screen list or is input directly (step S13).

Thereafter, a question asking whether or not a gasoline maker is specified is displayed on the screen (step S14). If the result of the determination at step S14 is affirmative, the name of the maker is input directly or selected from the screen list (step S15). A search range setting screen indicating the radius, in kilometers, of the area being searched around the vehicle is displayed. The desired distance is input in kilometer (step S16). If the result of the determination at step S14 is negative, the search range setting screen is immediately displayed and the desired distance can be input in kilometer (step S16).

The priority selecting screen which is displayed during route guiding is displayed. When route guiding is performed, it is determined whether or not information only along the route is to be searched (selected) (step S17). If the result of the determination at step S17 is negative, a route range is set in which a specified area from the route is searched (step S18). This setting may be performed by direct input. The set input information is stored in the memory 12c (step S19).

The set input information may be stored in a flash memory so that the information is not deleted when the navigation apparatus 10 is turned off, or it may be stored at the database in the fixed station via wireless communication.

Once the initial setting is done, the stored information can be used for subsequent purchases. This eliminates the necessity to re-set after this initial setting. This stored information can be altered or deleted at will.

A procedure up to display of route guiding to the destination after the initial setting is described.

FIG. 3 is a flowchart showing this procedure.

The shopping menu is displayed on the monitor 11a (step S31) and the gasoline is selected from the menu (step S32). This selection causes the CPU 12a to cause the wireless communication unit 12d to communicate with the fixed station to access the database containing information on the locations of the gas stations, products in which gas stations deal such as gasoline and light oil, names of brands available, prices, and the like (step S33).

At this time, if necessary, a message indicating that communication is being performed may be displayed on the monitor 11a. Predetermined area information that is obtained by causing the CPU 12a to compute, based on the vehicle position, a range set in advance by the user may be transmitted to the database of the fixed station via wireless communication.

Subsequently, when data is received from the database in the fixed station via wireless communication, characteristic information on the locations of the gas stations, products in which gas stations deal such as gasoline and light oil, names of brands available, the prices, and the like are stored in the memory 12c (step S34).

The CPU 12a selects (searches) the optimum information that matches the conditions set in advance by the user from the information which is stored at step S34 (step S35). Thereafter, route setting is automatically started (step S36) and then route guiding is performed (step S37). The CPU 12a determines whether the user reaches the destination (step S38). If the result of the determination is negative, the process proceeds back to step S37, which means that route guiding is performed until the user reaches the destination. When the user reaches the destination, route guiding is terminated (step S39).

Although the operation is described using a case, as the example, in which the gasoline is purchased, the navigation apparatus according to the present invention may be applied to services which are offered by restaurants, sports facilities, hospitals, or the like.

What is claimed is:

1. A navigation apparatus for detecting the present position of a vehicle based on position information and performing route guiding from the present position to a destination based on map information, the navigation apparatus comprising:

inputting means for inputting request information to obtain specific information concerning a product and selection conditions for said product;

transmitting means for transmitting the input request information to external storage means in which a plurality of characteristic information related to said product is stored;

receiving means for receiving from said external storage means the characteristic information which are selected from the plurality of characteristic information in accordance with the inputted selecting conditions;

displaying means for displaying the characteristic information on a navigation map; and guiding means for automatically setting the position of a provider for said product conforming to said characteristic information and performing route guiding from the present position to the position of said provider.

2. A navigation apparatus for detecting the present position of a vehicle based on position information and performing route guiding from the present position to a destination based on map information, the navigation apparatus comprising:

inputting means for inputting specific information concerning a product for purchase and selection conditions for said product for purchase;

first storage means for storing the selection conditions for said product for purchase;

transmitting means for wirelessly transmitting, to a fixed station, at least the specific information concerning said product which is input by said inputting means;

receiving means for receiving, from said fixed station, characteristic information of said product for purchase selected by said fixed station;

second storage means for storing the received characteristic information of said product for purchase;

retrieving means for retrieving the characteristic information which is received by said receiving means; and displaying means for displaying the characteristic information retrieved by said retrieving means;

wherein characteristic information that matches said selection conditions for said product for purchase is retrieved from the characteristic information of said product for purchase which is received by said receiving means, and the position of a provider of said product for purchase is retrieved based on the retrieved characteristic information of said product, whereby route guiding from the present position to the provider position is performed.

3. The navigation apparatus according to claim 2 wherein the selection conditions for said product include at least the type and price of the product for purchase.

4. The navigation apparatus according to claim 3 wherein said transmitting means transmits the inputted selection conditions for said product for purchase to said fixed station.

5. The navigation apparatus according to claim 2 wherein route guiding to the position of said provider of said product for purchase is performed using route display and/or speech.

6. The navigation apparatus according to claim 2 wherein said inputting means includes means for displaying a shopping menu, whereby the user can select a desired product for purchase from the shopping menu, and the user's selection is transmitted to said fixed station as said specific information.

7. A method for use in a navigation apparatus for detecting the present position of a vehicle based on position information and performing route guiding from the present position to a destination based on map information, the method comprising the steps of:

inputting specific information concerning a product for purchase and selection conditions for said product for purchase;

wirelessly transmitting, to a fixed station, at least said input specific information concerning the product for purchase;

receiving, from said fixed station, characteristic information of said product for purchase selected by said fixed station;

retrieving the received characteristic information; and displaying the characteristic information retrieved;

wherein characteristic information that matches said selection conditions for said product is retrieved from the received characteristic information, and the position of a provider of said product for purchase is retrieved based on the retrieved characteristic information of said product for purchase, whereby route guiding from the present position to the provider position is performed.

8. The method according to claim 7 wherein the inputted selection conditions are transmitted to said fixed station.

9. The method according to claim 7 wherein the selection conditions for said product for purchase include at least the type and price of the product for purchase.

10. The method according to claim 7 wherein said inputting includes displaying a shopping menu, whereby the user can select a desired product for purchase from the shopping menu, and the user's selection is transmitted to said fixed station as said specific information.

11. The navigation apparatus according to claim 1, wherein said guiding means further selects one of the characteristic information in accordance with at least one selection condition further inputted from the inputting means if there is no conformance to the characteristic information;

said display means further displays the selected characteristic information; and said guiding means performs guidance to a position of a selected provider for said product.

12. A navigation apparatus according to claim 1, further comprising storage means for storing the received characteristic information.

* * * * *